Figure 1:
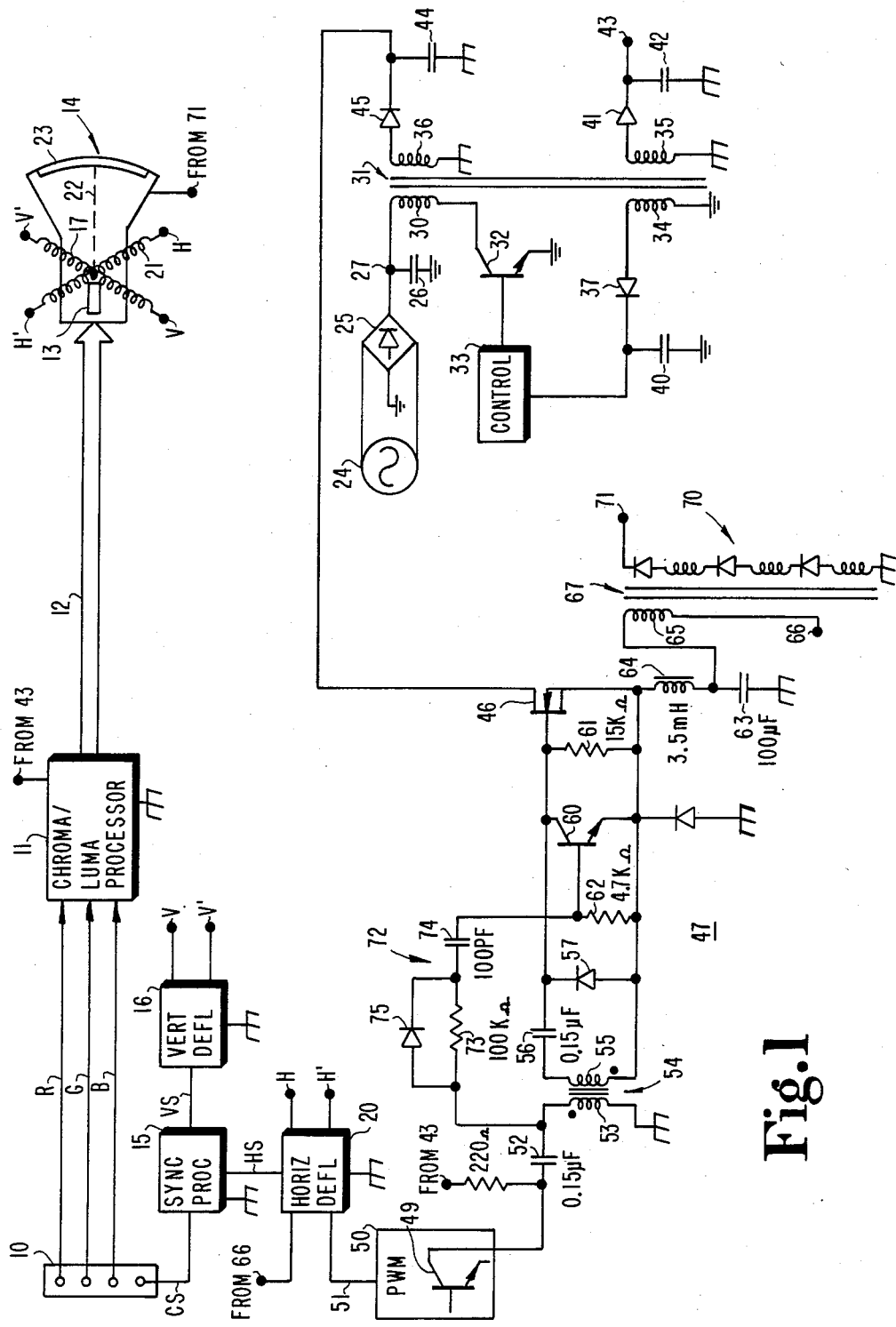

United States Patent [19]
Wharton

[11] Patent Number: 4,740,877
[45] Date of Patent: Apr. 26, 1988

[54] POWER SUPPLY DRIVE CIRCUIT IMPROVEMENT

[75] Inventor: James H. Wharton, Indianapolis, Ind.

[73] Assignee: RCA Corporation, Princeton, N.J.

[21] Appl. No.: 879,739

[22] Filed: Jun. 27, 1986

[51] Int. Cl.[4] .................................. H02M 3/335
[52] U.S. Cl. ..................... 363/21; 315/411; 358/190
[58] Field of Search ............ 363/21, 41, 97; 315/411; 358/190

[56] References Cited

U.S. PATENT DOCUMENTS

| | | | |
|---|---|---|---|
| 3,970,780 | 7/1976 | Minoura | 178/7.3 R |
| 3,986,052 | 10/1976 | Hunter | 307/270 |
| 4,186,434 | 1/1980 | Cowett, Jr. | 363/24 |
| 4,292,654 | 9/1981 | Steckler et al. | 315/411 X |
| 4,302,802 | 11/1981 | Hyde et al. | 363/21 |
| 4,347,559 | 8/1982 | Sturgeon | 363/21 |
| 4,385,263 | 5/1983 | Luz et al. | 315/411 |
| 4,423,341 | 12/1983 | Shelly | 307/570 |
| 4,439,821 | 3/1984 | Grippe | 363/26 |
| 4,510,564 | 4/1985 | Seer, Jr. | 363/23 |
| 4,516,169 | 5/1985 | Truskalo | 358/190 |
| 4,524,411 | 6/1985 | Willis | 363/21 |
| 4,588,929 | 5/1986 | Wedam et al. | 315/395 |

OTHER PUBLICATIONS

"Linear Integrated Circuits", Thomas Young, p. 329, 1981.
"Microelectronics", J. Millman, p. 682, 1979.

*Primary Examiner*—Patrick R. Salce
*Assistant Examiner*—Marc S. Hoff
*Attorney, Agent, or Firm*—Paul J. Rasmussen; Joseph J. Laks; Scott J. Stevens

[57] ABSTRACT

A power supply for a video display apparatus includes circuitry that produces a pulse width modulated signal in response to the selected horizontal deflection rate. The pulse width modulated signal controls the switching of an FET through a transformer to provide a load circuit operating voltage representative of the deflection frequency. A turn-off signal for the FET is provided to a turn-off transistor from the primary winding of the transformer to insure rapid turn off of the FET.

8 Claims, 3 Drawing Sheets

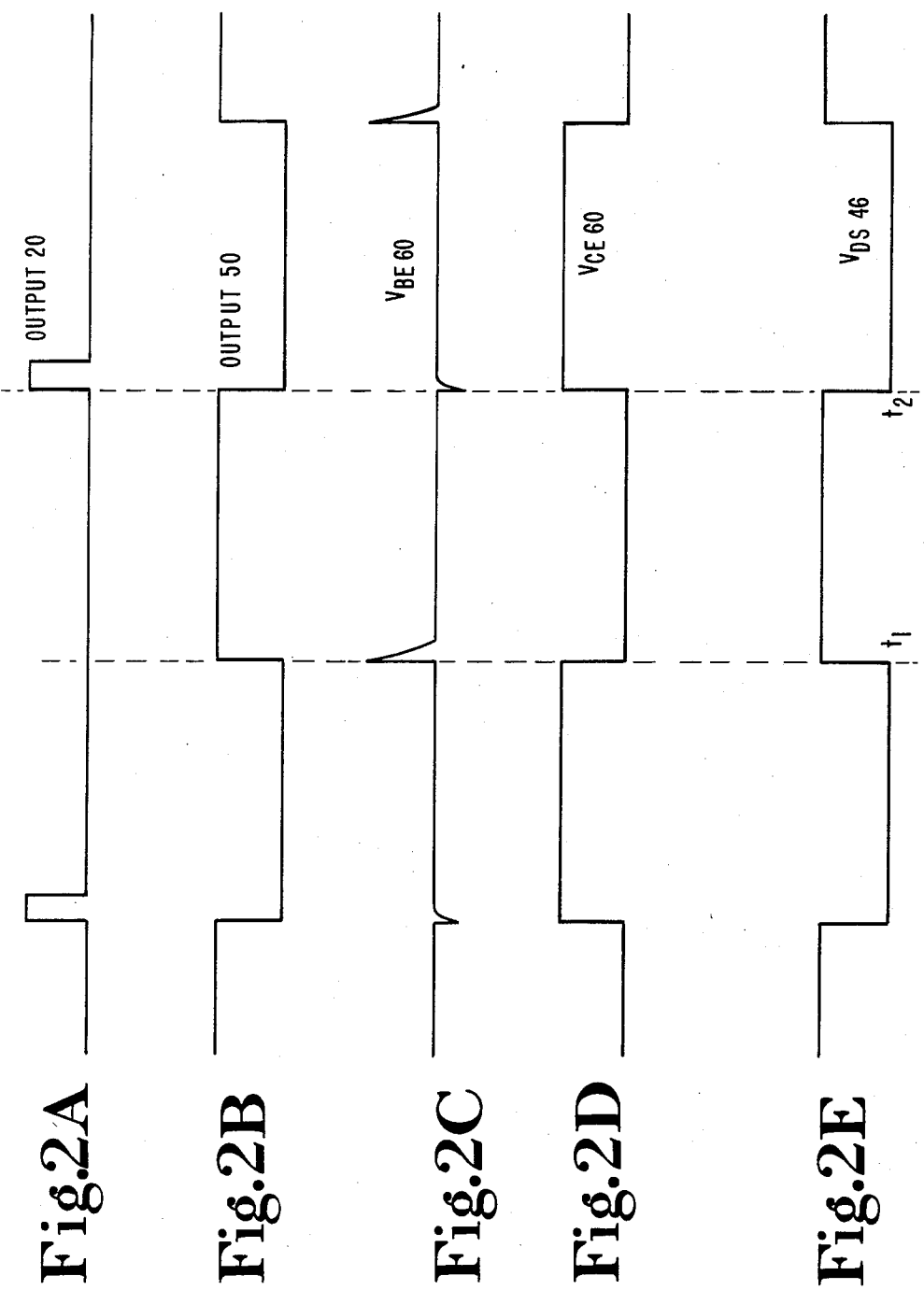

POWER SUPPLY DRIVE CIRCUIT IMPROVEMENT

This invention relates to power supplies for video display apparatus and, in particular, to power supplies that incorporate switching devices.

A video display apparatus, such as a computer monitor, incorporates one or more power supplies that produce regulated voltage levels for various load circuits of the video display apparatus. Additionally, monitors that operate at more than one selectable horizontal or line-rate deflection frequency may require different operating voltages for certain circuits, in particular the horizontal output stage, at different operating or scan frequencies. It is possible to produce the range of desired voltage levels by providing multiple windings or taps on a power supply transformer, for example. The appropriate tap or winding is then selected for a given scan frequency. Such selection may be inconvenient and time consuming or, if done automatically by circuitry, complex and costly to implement. A pulse width modulating frequency to voltage converter on the other hand, provides the ability to produce the desired operating voltages in response to a given operating or scan frequency. The operating voltage is typically developed across a capacitor that is charged from a voltage source by periodic coupling via a switching device. The switching device, such as a field effect transistor (FET), for example, is responsive to a frequency-dependent pulse width modulated (PWM) signal. The PWM signal is dependent on the operating or scan frequency so that the capacitor voltage is in turn determined by the operating frequency also.

It is important that the switching device change conductive states as rapidly as possible so that the power, and resulting heat, that are dissipated in the switching device are kept to a minimum.

In accordance with an aspect of the present invention, a power supply for a video display apparatus comprises circuitry that provides a first signal having a frequency representative of an operating frequency of the video display apparatus. A circuit is responsive to the first signal and produces a second signal having pulse widths determined by the frequency of the first signal. The second signal energizes a first winding of a transformer, which in turn energizes a second winding of the transformer. A first switch is coupled to the second winding and receives a first input signal. The switch has an output terminal connected to a capacitor, which is charged in response to the input signal to a voltage level representative of the frequency of the first signal. A second switch is connected to the transformer first winding and is responsive to the energization of the first winding for providing a second input signal to said first switch means.

In the accompanying drawing,

FIG. 1 is a block and schematic drawing of a portion of a video display apparatus incorporating a power supply in accordance with an aspect of the present invention; and FIGS. 2 and 3 illustrate waveforms associated with the circuit of FIG. 1.

Referring to FIG. 1, there is shown a portion of a video display apparatus, illustratively shown as a color computer monitor, in which a video signal in the form of red, green and blue color video components are applied to the video display apparatus, for example, from a computer (not shown) via an input terminal strip 10. The color video components, designated R, G, and B are applied to chrominance and luminance processing circuitry 11 which generates the red, green and blue color drive signals. The color drive signals are applied via a conductor 12 to the electron gun assembly 13 located within the neck of a cathode ray tube (CRT) 14.

Also applied to the video display apparatus via terminal strip 10 is a synchronizing (sync) signal, designated CS, that illustratively incorporates both line and field rate synchronizing information. The sync signal is applied to synchronizing signal processing circuitry 15 that separates the respective line and field rate sync information. The field rate, or vertical, sync pulses are applied via conductor designated VS to vertical deflection circuitry 16 which produces vertical or field rate deflection current via terminal V and V' in vertical deflection windings 17, located on CRT 14. Horizontal or line rate sync pulses are applied via a conductor designated HS to horizontal deflection circuitry 20 which produces horizontal or line rate deflection current via terminals H and H' in horizontal deflection windings 21, also located on CRT 14. The deflection currents flowing in deflection windings 17 and 21 create electromagnetic deflection fields that provide horizontal and vertical deflection of the electron beams 22 generated by electron gun assembly 13 in a predetermined pattern in order to form a scanned raster on a phosphor display screen 23 located on the front panel of CRT 14.

It is desirable to configure the deflection circuitry of a video display apparatus operating as a computer monitor to be able to operate at different deflection or scan frequencies, in order to be compatible with different computers having various operating frequencies, or with computers having two or more selectable frequencies that may be used to improve the resolution of the video display. The frequency of the synchronizing information on conductor CS, as indicative of the deflection frequency, may be used to cause the respective deflection circuitry to operate at the proper frequency. Proper operation of the deflection circuits, such as horizontal deflection circuitry 20, may require adjustment of the operating supply voltages at different deflection or operating frequencies. In accordance with an aspect of the present invention, this is accomplished in the following manner.

A source of power, such as AC line supply 24, is connected to a rectifying circuit 25 and a filter capacitor 26 to provide a source of unregulated DC voltage at a terminal 27. The unregulated DC voltage is applied to one terminal of a winding 30 of a power transformer 31. The other terminal of winding 30 is connected to the collector of a switching transistor 32. Conduction of transistor 32, determined by control circuit 33, causes current to flow in winding 30 which, by transformer action, causes current to flow in windings 34, 35 and 36. The current in winding 34 is rectified by diode 37 and charges capacitor 40 to develop a feedback voltage that is applied to control circuit 33. In response to the feedback voltage, control circuit 33 controls the conduction interval of transistor 32 in order to maintain the voltage across capacitor 40 at a constant regulated level. Regulation of the voltage across capacitor 40 results in regulation of the load supplies derived from transformer windings 35 and 36. Transformer 31 also provides electrical isolation between the "hot" AC line and the "cold" load circuits and user interface connectors, such as input terminal strip 10. Winding 35 current, rectified by diode 41, charges capacitor 42 to provide a voltage at a terminal 43 that is used to power various circuits of the video display apparatus, such as chrominance and luminance processing circuit 11, for example. The voltage established across capacitor 44, derived from winding 36 via diode 45, is applied to the drain terminal of a field effect transistor (FET) 46. In accordance with an aspect of the present invention, FET 46 forms part of a frequency dependent power supply circuit 47 that operates as follows.

Figure 3A:
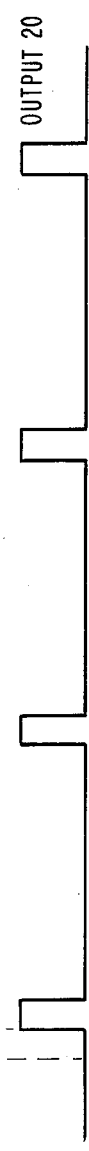

Power supply circuit 47, operating as a DC to DC converter, incorporates pulse width modulating circuit 50, which receives an input signal on a conductor 51 from horizontal deflection circuit 20, as shown in FIGS. 2A and 3A. Illustratively, FIG. 2 illustrates circuit operation at a horizontal deflection rate of 15.75 kHz. FIG. 3 illustrates operation at 31.50 kHz. The signal on conductor 51 comprises pulses occurring at the horizontal deflection or line rate. Pulse width modulator circuit 50, illustratively comprising an integrated circuit, designated for example, as NE5560, manufactured by Signetics Corporation, incorporates an output transistor 49. Pulse width modulator circuit 50 produces an output signal, shown in FIGS. 2B and 3B, incorporating pulses having pulse widths and frequency determined in response to the input pulse frequency. The output signal of pulse width modulator circuit 50 is applied via coupling capacitor 52 to primary winding 53 of a transformer 54. Secondary winding 55 of transformer 54 has one terminal coupled via capacitor 56 to the cathode of a diode 57, the collector of a transistor 60, one terminal of a resistor 61 and the gate of FET 46. The other terminal of secondary winding 55 is coupled to the anode of diode 57, a transistor bias resistor 62, the emitter of transistor 60, the other terminal of resistor 61 and the source terminal of FET 46. The source terminal of FET 46 is also coupled to a supply capacitor 63 via an inductor 64. Transformer 54 provides DC isolation that allows the secondary circuits to be referenced to the voltage across capacitor 63.

The deflection rate or frequency representative pulses produced by pulse width modulator circuit 50 that are applied to primary winding 53 cause switching of FET 46 by transformer action. Conduction of FET 46 charges capacitor 63 via FET 46 and inductor 64 from the supply voltage developed across capacitor 44. Since the conduction time of FET 46 is determined by the horizontal deflection frequency represented by the deflection frequency representative pulses from pulse width modulator circuit 50, the voltage developed across capacitor 63 will also be dependent upon the horizontal deflection rate or frequency and may therefore be utilized as a supply voltage for circuits that require different operating voltage levels in response to different deflection frequencies. The voltage across capacitor 63 is applied to horizontal deflection circuitry 20 through a transformer winding 65 via a terminal 66. Winding 65 forms the primary winding of a high voltage transformer 67. Conventional flyback or retrace pulses produced by horizontal deflection circuit 20 develop a voltage across tertiary winding 70 that forms a high voltage or ultor potential at a terminal 71 that is applied to CRT 14.

In order to avoid dissipating a significant amount of power in FET 46, and hence prevent its overheating, it is important that FET 46 be switched between its conduction states as quickly as possible. Switching delay due to the turn off time of output transistor 49 of pulse widths modulator 50 and due to the leakage inductance of transformer 54 may cause FET 46 to overheat, thereby decreasing the reliability and durability of FET 46.

Figure 3B:
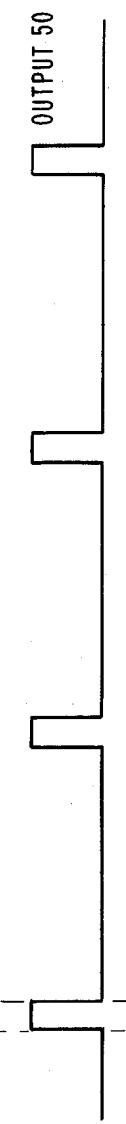
Figure 3C:
Figure 3D:
Figure 3E:
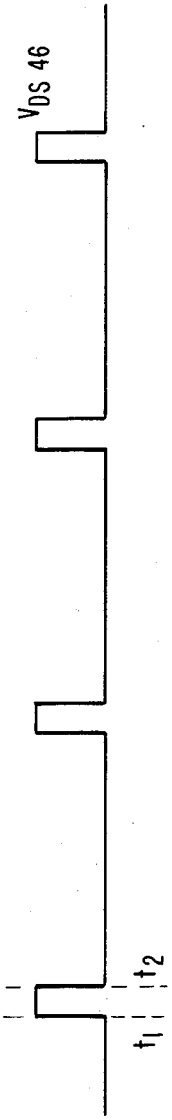

In accordance with a novel aspect of the present invention, pulses from pulse width modulator circuit 50, shown in FIGS. 2B and 3B, are coupled from the primary winding of transformer 54 to the base of transistor 60 via differentiating network 72 comprising resistor 73, capacitor 74, and diode 75. The leading edge of the turn-off pulse for FET 46, occurring at time $t_1$, is differentiated by differentiating network 72 to form the positive going pulse signal shown in FIGS. 2C and 3C, which is applied to the base of transistor 60. The differentiated pulse from the trailing edge of the modulator 50 pulses is reduced in amplitude by diode 75. The differentiated positive-going pulses quickly turn on transistor 60, as shown by the collector-emitter voltage waveform in FIGS. 2D and 3D. Conduction of transistor 60 rapidly turns off FET 46, as shown in FIGS. 2E and 3E. FET 46 is effectively turned on by the occurrence of a synchronizing pulse at time $t_2$, which determines the end of the turn-off pulse. FET 46 therefore dissipates very little power during switching with the result that the operating temperature of FET 46 remains low, which contributes to high reliability.

What is claimed is:

1. A power supply for a video display apparatus comprising:

means for providing a first signal having a frequency representative of an operating frequency of said video display apparatus:

means responsive to said first signal for producing a second signal comprising pulses having pulse widths determined by said frequency of said first signal;

a transformer having a winding coupled to said second signal producing means and being energized therefrom, and having a second winding energized from said first winding;

first switching means coupled to said second winding for receiving a first input switching signal therefrom, said first switching means having an output terminal;

a capacitor coupled to said output terminal and being charged in response to said input signal for establishing a voltage thereacross representative of said frequency of said first signal; and second switching means coupled to said first switching means and to said first winding and responsive to the energization thereof for providing a nonmagnetically derived second input switching signal to said first switching means.

2. The arrangement defined in claim 1, wherein said second signal renders said first switching means nonconductive.

3. The arrangement defined in claim 1, wherein said first switching means comprises a field effect transistor.

4. The arrangement defined in claim 1, wherein said operating frequency comprises a line-rate deflection frequency.

5. A power supply for a video display apparatus comprising:

means for providing a signal having a characteristic representative of a selected operating frequency of said video display apparatus;

a transformer comprising a first winding coupled to said signal providing means and being energized therefrom, and a second winding magnetically coupled to said first winding;

a switch coupled to said second winding for receiving first switching pulses therefrom for rendering said switch conductive;

a capacitor coupled to said switch for being charged when said switch is rendered conductive in order to establish a supply voltage thereacross; and means coupled to said first winding and to said switch for providing second switching pulses nonmagnetically derived from said first winding to said switch, said first and second switching pulses working in combination to render said switch nonconductive.

6. The arrangement defined in claim 5, wherein said means coupled to said first winding and to said switch comprises signal differentiating means.

7. A power supply for a video display apparatus comprising:

means for providing a signal having a characteristic representative of a selected operating frequency of said video display apparatus;

a transformer comprising a first winding coupled to said signal providing means and being energized therefrom, and a second winding magnetically coupled to said first winding;

a switch, having a control terminal capable of turning on and turning off a main current path of said switch located between second and third terminals of said switch, said control terminal being coupled to said second winding for receiving first switching pulses therefrom at said control terminal; and means coupled to said first winding and to said control terminal of said switch for providing to said control terminal second switching pulses nonmagnetically derived from said first winding, said first and second switching pulses in combination working to render said switch nonconductive.

8. The arrangement defined in claim 7, wherein said second switching pulses cause said switch to switch between conductive states more rapidly than said first switching pulses.

* * * * *